United States Patent [19]
Zuraski, Jr. et al.

[11] Patent Number: 5,737,629
[45] Date of Patent: Apr. 7, 1998

[54] DEPENDENCY CHECKING AND FORWARDING OF VARIABLE WIDTH OPERANDS

[75] Inventors: Gerald D. Zuraski, Jr.; Scott A. White; Murali S. Chinnakonda; David S. Christie, all of Austin, Tex.

[73] Assignee: Advanced Micro Devices, Inc., Sunnyvale, Calif.

[21] Appl. No.: 671,439

[22] Filed: Jun. 27, 1996

Related U.S. Application Data

[63] Continuation of Ser. No. 233,567, Apr. 26, 1994, Pat. No. 5,590,352.
[51] Int. Cl.$^6$ ............................................ G06F 9/38
[52] U.S. Cl. .............................. 395/800.23; 395/392
[58] Field of Search .................. 395/800, 800.23, 395/392, 393, 382

[56] References Cited

U.S. PATENT DOCUMENTS

| | | | |
|---|---|---|---|
| 4,219,874 | 8/1980 | Gusev | 395/800 |
| 4,598,359 | 7/1986 | Boothroyd et al. | 395/375 |
| 4,736,288 | 4/1988 | Shintani et al. | 364/200 |
| 4,807,115 | 2/1989 | Torng | 364/200 |
| 4,928,223 | 5/1990 | Dao et al. | 364/200 |
| 4,965,724 | 10/1990 | Utsumi | 395/375 |
| 5,056,006 | 10/1991 | Acharya et al. | 395/425 |
| 5,129,067 | 7/1992 | Johnson | 395/375 |
| 5,136,697 | 8/1992 | Johnson | 395/375 |
| 5,155,816 | 10/1992 | Kohn | 395/375 |
| 5,155,820 | 10/1992 | Gibson | 395/375 |
| 5,168,571 | 12/1992 | Hoover | 395/800 |
| 5,179,691 | 1/1993 | O'Brien | 395/500 |

(List continued on next page.)

FOREIGN PATENT DOCUMENTS

| | | |
|---|---|---|
| 0381471 A2 | 8/1990 | European Pat. Off. |
| 93/01546 | 1/1993 | WIPO |

OTHER PUBLICATIONS

R.M. Tomasulo, "An Efficient Algorithm for Exploiting Multiple Arithmetic Units", Part 2 Regions of Computer Space, Section 3 Concurrency: Single-Processor System, IBM Journal, vol. 11, Jan. 1967, pp. 293–305.

U.S. Patent Application Ser. No. 08/145,902 filed Oct. 29, 1993 entitled "Speculative Instruction Queue and Method Therefor Particularly Suitable for Variable Byte–Length Instructions" — David B. Witt, Attorney Docket M–2279 US.

(List continued on next page.)

*Primary Examiner*—Eric Coleman
*Attorney, Agent, or Firm*—Skjerven, Morrill, MacPherson, Franklin & Friel LLP; Ken J. Koestner

[57] ABSTRACT

A pipelined or superscalar processor (10) that executes operations utilizing operand data of variable bit widths improves parallel performance by partitioning a fixed bit width operand (200) into several partial operand fields (215, 216 and 217), and checking for data dependencies, tagging and forwarding data in these fields independently of one another. An instruction decoder (18) concurrently dispatches multiple ROPs to various functional units (20, 21, 22 and 80). Conflicts which arise with respect to register resources are resolved through register renaming. However, implementation of register renaming is difficult when register structures are overlapping. The present invention supports independent dependency checking, tagging and forwarding of partial bit fields of a register operand which, in combination, allow renaming of registers. Therefore, the variable width register operand structure greatly assists the processor to resolve data dependencies. Operands are tagged by a reorder buffer (26) and supplied with data when it becomes available without regard for the type of data. This method of dependency resolution supports parallel performance of operations and provides a substantial improvement in overall speed of processing. Thus, the processor promotes parallel processing of operations that act upon overlapping data structures which otherwise resist parallel handling.

26 Claims, 13 Drawing Sheets

U.S. PATENT DOCUMENTS

| | | | |
|---|---|---|---|
| 5,226,126 | 7/1993 | McFarland et al. | 395/375 |
| 5,226,130 | 7/1993 | Favor et al. | 395/375 |
| 5,247,644 | 9/1993 | Johnson et al. | 395/425 |
| 5,251,306 | 10/1993 | Tran | 395/375 |
| 5,327,543 | 7/1994 | Miura | 395/565 |
| 5,542,058 | 7/1996 | Brown, III | 395/375 |
| 5,590,352 | 12/1996 | Zuraski | 395/800 |

OTHER PUBLICATIONS

U.S. Patent Application Ser. No. 08/145,905 filed Oct. 29, 1993 entitled "Pr Decoded Instruction Cache and Method Therefor Particularly Suitable for Variable Byte-Length Instructions" — David B. Witt and Michael D. Goddard, Attorney Docket M-2278 US.

U.S. Patent application Ser. No. 08/146,376 filed Oct. 29, 1993 entitled "Hig Performance Load/Store Functional Unit and Data Cache" — William M. Johnso David B. Witt, and Murali Chinnakonda, Attorney Docket M-2281 US.

U.S. Patent application Ser. No. 08/146,382 filed Oct. 29, 1993 entitled "Hig Performance Superscalar Microprocessor" — David B. Witt and William M. Johnson, Attorney Docket M-2218 US.

U.S. Patent application Ser. No. 08/146,383 filed Oct. 29, 1993 entitled "Superscalar Instruction Decoder" — David B. Witt and Michael D. Goddard, Attorney Docket M-2280 US.

U.S. Patent application Ser. No. 08/233,563 filed Apr. 26, 1994 entitled "Mix Integer/Floating Point Core" — Scott A. White, Michael D. Goddard, and William M. Johnson, Attorney Docket M-2518-IP US.

U.S. Patent application Ser. No. 08/233,568 filed Apr. 26, 1994 entitled "A Range Finding Circuit Using Circular Carry Lookahead" — Scott A. White, Attorney Docket M-2657 US.

Toyohiko Yoshida, et al., "The Approach to Multiple Instruction Execution the GMICRO/400 Processor", ©1991, pp. 185.195.

Brian Case, "AMD Unveils First Superscalar 29K Core", *Microprocessor Report* Oct. 24, 1994, pp. 23–26.

Michael Slater, "AMD's K5 Designed to Outrun Pentium", *Microprocessor Report*, Oct. 24, 1994, pp. 1, 6–11.

REGISTER FILE ARRAY 62

| BITS 8:7<br>BITS 6:3 | 00<br><31:0> | 01<br><40:0> | 10<br><40:0> | | 11<br><40:0> | |
|---|---|---|---|---|---|---|
| 0000 | | EAX | — | (L) | FP0 | (H) |
| 0001 | | ECX | — | (L) | FP1 | (H) |
| 0010 | | EDX | — | (L) | FP2 | (H) |
| 0011 | | EBX | — | (L) | FP3 | (H) |
| 0100 | | ESP | — | (L) | FP4 | (H) |
| 0101 | | EBP | — | (L) | FP5 | (H) |
| 0110 | | ESI | — | (L) | FP6 | (H) |
| 0111 | | EDI | — | (L) | FP7 | (H) |
| 1000 | ETMP0 | ETMP8 | (L) | FTMP0 | | (H) |
| 1001 | ETMP1 | ETMP9 | (L) | FTMP1 | | (H) |
| 1010 | ETMP2 | ETMP10 | (L) | FTMP2 | | (H) |
| 1011 | ETMP3 | ETMP11 | (L) | FTMP3 | | (H) |
| 1100 | ETMP4 | ETMP12 | (L) | FTMP4 | | (H) |
| 1101 | ETMP5 | ETMP13 | (L) | FTMP5 | | (H) |
| 1110 | ETMP6 | ETMP14 | (L) | FTMP6 | | (H) |
| 1111 | ETMP7 | ETMP15 | (L) | FTMP7 | | (H) |
| | <40:0> | | <81:0> | | | |

FIG. 9

| Instruction | destination | source |
| --- | --- | --- |
| mov ah, byte1 | EAX | EAX, imm |
| mov al, byte2 | EAX | EAX, imm |
| mov word12, ax | | EAX |

FIG. 12

| Instruction | destination | source |
| --- | --- | --- |
| mov ah, byte1 | AH | imm |
| mov al, byte2 | AL   C | imm |
| mov word12, ax | D | AH and AL |

FIG. 13

DEPENDENCY CHECKING AND FORWARDING OF VARIABLE WIDTH OPERANDS

This is a continuation of Ser. No. 08/233,567 filed on Apr. 26, 1994 now U.S. Pat. No. 5,590,352.

BACKGROUND OF THE INVENTION

1. Field of the Invention

The present invention relates to a processor architecture, and more particularly to a processor architecture for handling variable bit width data.

2. Description of the Related Art

Processors generally process a single instruction of an instruction set in several steps. Early technology processors performed these steps serially. Advances in technology have led to pipelined-architecture processors, also called scalar processors, which perform different steps of many instructions concurrently. A "superscalar" processor is implemented using a pipelined structure, but improves performance by concurrently executing scalar instructions.

In a superscalar processor, instruction conflicts and dependency conditions arise in which an issued instruction cannot be executed because data or resources are not available. For example, an issued instruction cannot execute when its operands are dependent upon data calculated by other nonexecuted instructions.

Superscalar processor performance is improved by the speculative execution of branching instructions and by continuing to decode instructions regardless of the ability to execute instructions immediately. Decoupling of instruction decoding and instruction execution requires a buffer between the processor's instruction decoder and functional units that execute instructions.

Performance of a superscalar processor is also improved when multiple concurrently-executing instructions are allowed to access a common register. However, this inherently creates a resource conflict. One technique for resolving register conflicts is called "register renaming". Multiple temporary renaming registers are dynamically allocated, one for each instruction that sets a value for a permanent register. In this manner, one permanent register may serve as a destination for receiving the results of multiple instructions. These results are temporarily held in the multiple allocated temporary renaming registers. The processor keeps track the renaming registers so that an instruction that receives data from a renaming register accesses the appropriate register. This register renaming function may be implemented using a reorder buffer which contains temporary renaming registers.

Many existing processors run a large base of computer programs but are limited in performance. To improve instruction throughput in such processors, it may be desirable to incorporate superscalar capabilities therein. W. M. Johnson in *Superscalar Processor Design*, Englewood Cliffs, N.J., Prentice Hall, 1991, p. 261–272, discusses such a superscalar implementation.

For example, a family of processors, called the x86 family, have been developed including 8086, 80286, 80386, 80486 and Pentium™ (Intel Corporation, Santa Clara, Calif.) processors. Advantageously, x86 processors are backward compatible. The newest processors run the same programs as older processors. x86 processors are considered to employ a complex-instruction-set-computer (CISC) architecture, in which many different densely-coded instructions are implemented.

A variety of techniques have been used in the x86 family to implement backward compatibility. These techniques have made the implementation of register renaming very difficult. For example, the x86 instruction set uses registers for which at least a subset of bits overlap the bits of another register, such as word registers that overlap double word registers and byte registers that overlap word and double-word registers. As x86 processors evolved from 8 to 16-bit and then to 32-bit processors, the register architecture similarly evolved into a form in which 8-bit general registers AH and AL, respectively, comprise the high and low bytes of a 16-bit general register AX. AX, in turn, includes the low order 16 bits of a 32-bit extended general register EAX. B, C and D registers are similarly constrained. These registers are supplemented by additional register pairs: ESI:SI, EDI:DI, ESP:SP and EBP:BP, having low order bits of the 32-bit extended (E) doubleword registers overlapped by 16-bit word registers. In addition, x86 processors have an extensive and complicated instruction set that introduces additional complexity so that some instruction opcode fields that specify overlapping registers for some data widths also specify nonoverlapping registers of other data widths.

If registers cannot be renamed, register access conflicts are resolved only by having one instruction cede control to another, delaying the dispatch of an instruction until the instruction is free of dependencies and causing stalling of the parallel dispatching of instructions in the processor pipeline. This causes serial operation of instructions that are intended to be executed in parallel.

Because the x86 architecture includes a small number of registers (eight), frequent register reusage is encouraged for a superscalar processor that is intended to execute instructions in parallel. It is thus desirable to allow register reusage, perhaps by employing register renaming. Unfortunately, the overlapping nature of x86 instructions limits the renaming of overlapped registers for resolving mutual data dependencies. Register renaming is impeded because, although the overlap relationship of registers is known and invariable and thus predictable, architectural and code-compatibility constraints require that the registers be considered independent entities. Thus, although register renaming could resolve register resource conflicts in an x86 processor, the x86 architecture substantially limits register renaming.

It is fundamental to achieving a performance improvement using parallel processing that instructions be dispatched regularly and rapidly. When dispatching of instructions is stalled awaiting execution of another instruction, the processor performs only as well as a serial processor.

SUMMARY OF THE INVENTION

Accordingly, it is desirable in a superscalar or pipelined processor to provide an improved processor architecture that supports renaming of overlapping register bit fields. Also, it is desirable in a superscalar or pipelined processor to provide dependency checking and forwarding of overlapping register bit fields. The present invention employs partial register renaming to achieve dependency checking and result forwarding of overlapping data fields.

Embodiments of the present invention solve problems arising from parallel processing of overlapping data structures by providing an apparatus and method for performing operations upon variable size operands which include characterizing the variable-sized operands of each operation as several fields within a full size operand. Each field is designated as defined or undefined with respect to the instruction. The apparatus and method also determine whether the operation is data dependent upon the execution of another operation for each defined field of the variable size operand, independently of the other fields. When data becomes available, variable size data are forwarded for utilization in the operation for each defined field independently of the other fields.

A further embodiment of the present invention solves problems arising from parallel processing of overlapping data structures by providing a processor for performing operations utilizing operand data of a variable size. The processor includes an instruction decoder for decoding instructions that utilize variable size operands which are partitioned from a full size operand into several fields. The decoder designates each field as defined or undefined with respect to the instruction. The processor also includes a reorder buffer for temporarily storing control information and operand data relating to the operation and for determining whether variable size operand data utilized by the operation are available. Availability is determined for each defined field independently of the other fields. A plurality of functional units are supplied that execute operations and generate variable-sized result data for each defined field independently of the other fields. Several busses are included for accessing variable size operand data for utilization by a functional unit which executes an operation when the data upon which it is dependent becomes available. Availability of data is tested for each defined field independently of the other fields.

BRIEF DESCRIPTION OF THE DRAWINGS

The present invention may be better understood and its advantages, objects and features made better apparent by making reference to the following description, taken in conjunction with the accompanying drawings, in which like reference numbers identify like elements, and wherein:

FIG. 9 is a pictorial illustration of a memory format in the register file shown in FIG. 8;

FIG. 12 is a table that depicts dispatching of an exemplary sequence of instructions using a naive implementation of register renaming;

FIG. 13 is a table that depicts dispatching of an exemplary sequence of instructions using a preferred implementation of register renaming;

DETAILED DESCRIPTION OF THE PREFERRED EMBODIMENT

Figure 1A:
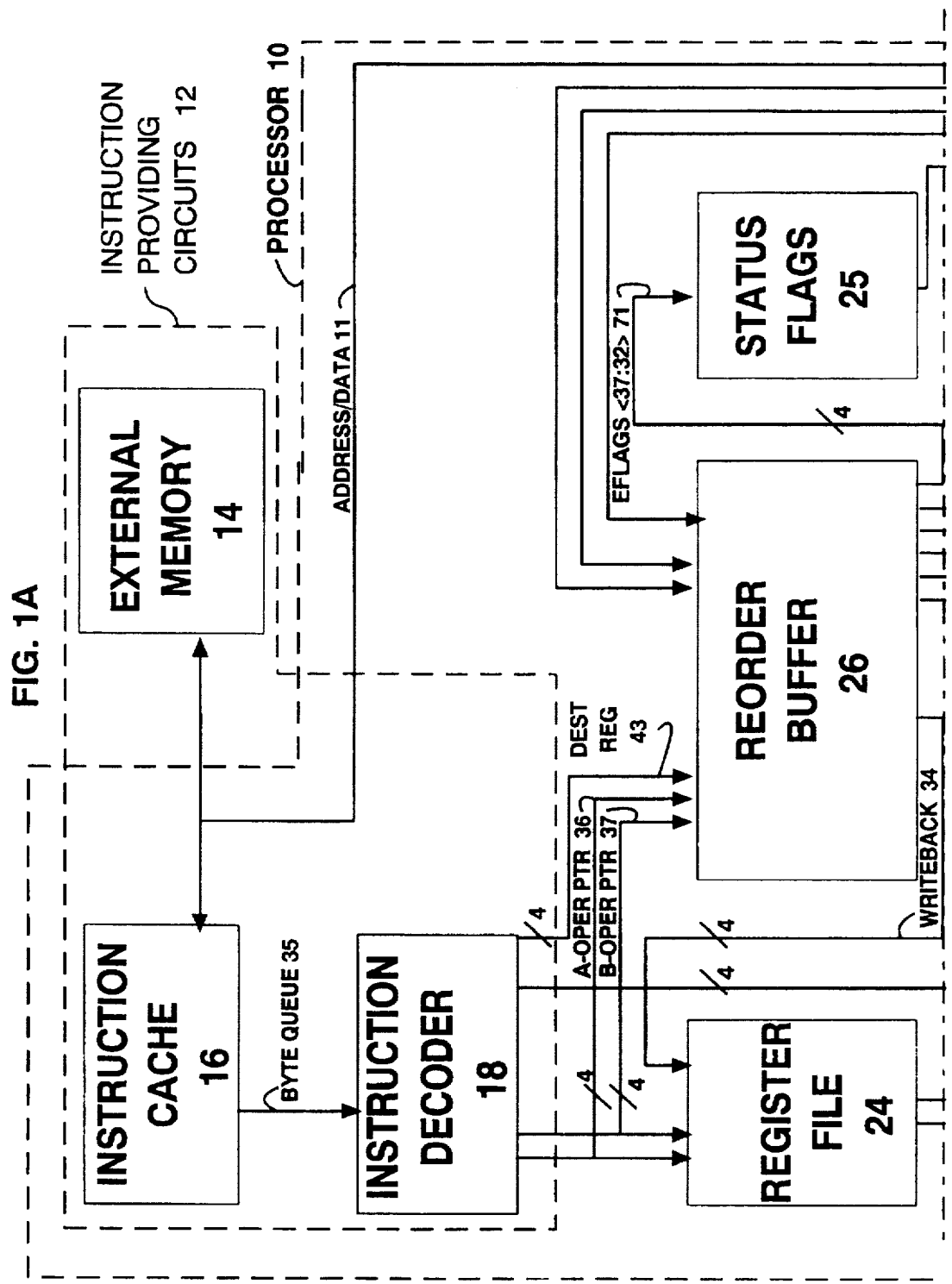
FIGS. 1a and 1b are a architecture-level block diagram of a processor which implements dependency checking and forwarding of variable width operands.
Figure 1B:
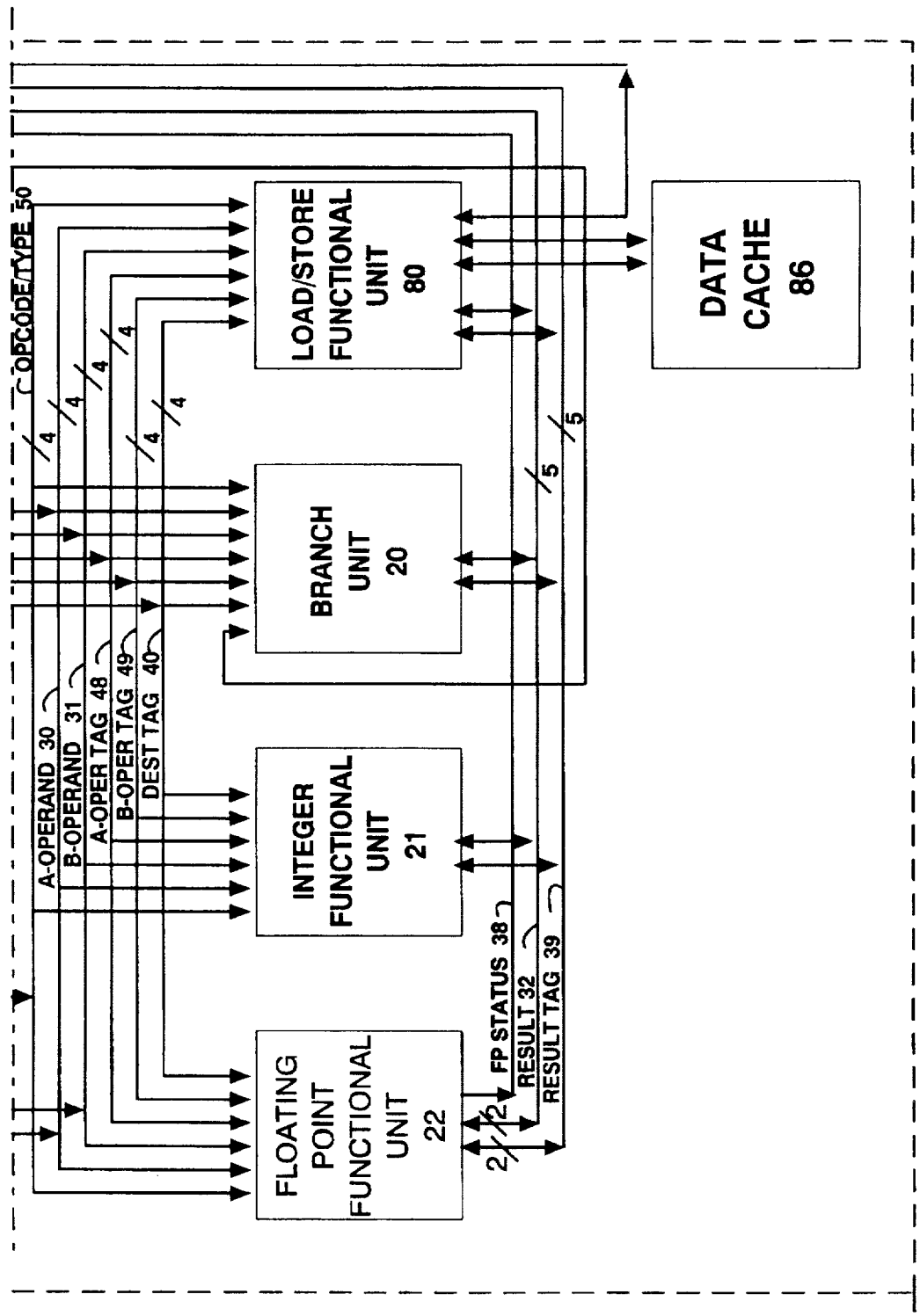

The architecture of a superscalar processor 10 having an instruction set for executing integer and floating point operations is shown in FIG. 1. A 64-bit internal address and data bus 11 communicates address, data, and control transfers among various functional blocks of the processor 10 and an external memory 14. An instruction cache 16 parses and pre-decodes CISC instructions. A byte queue 35 transfers the predecoded instructions to an instruction decoder 18, which maps the CISC instructions to respective sequences of instructions for RISC-like operations ("ROPs"). The instruction decoder 18 generates type, opcode, and pointer values for all ROPs based on the pre-decoded CISC instructions in the byte queue 35.

A suitable instruction cache 16 is described in further detail in U.S. patent application Ser. No. 08/145,905 filed on Oct. 29, 1993 (David B. Witt and Michael D. Goddard, "Pre-Decode Instruction Cache and Method Therefor Particularly Suitable for Variable Byte-Length Instructions". A suitable byte queue 35 is described in additional detail in U.S. patent application Ser. No. 08/145,902 filed on Oct. 29, 1993 (David B. Witt "Speculative Instruction Queue and Method Therefor Particularly Suitable for Variable Byte-Length Instructions" now abandoned for FWC. A suitable instruction decoder 18 is described in further detail in U.S. patent application Ser. No. 08/146,383 filed on Oct. 29, 1993 (David B. Witt and Michael D. Goddard "Superscalar Instruction Decoder" now abandoned for FWC. Each of these patent applications is incorporated herein by reference in its entirety.

The instruction decoder 18 dispatches ROP operations to functional blocks within the processor 10 over various busses. The processor 10 supports four ROP issue, five ROP results, and the results of up to sixteen speculatively executed ROPs. Up to four sets of pointers to the A and B source operands and to a destination register are furnished over respective A-operand pointers 36, B-operand pointers 37 and destination register pointers 43 by the instruction decoder 18 to a register file 24 and to a reorder buffer 26. The register file 24 and reorder buffer 26 in turn furnish the appropriate "predicted executed" versions of the RISC operands A and B to various functional units on four pairs of 41-bit A-operand busses 30 and B-operand busses 31. Associated with the A and B-operand busses 30 and 31 are operand tag busses, including four pairs of A-operand tag busses 48 and B-operand tag busses 49. When a result is unavailable for placement on an operand bus, a tag that identifies an entry in the reorder buffer 26 for receiving the result when it becomes available is loaded onto a corresponding operand tag bus. The four pairs of operand and operand tag busses correspond to four ROP dispatch positions. The instruction decoder, in cooperation with the reorder buffer 26, specifies four destination tag busses 40 for identifying an entry in the reorder buffer 26 that will receive results from the functional units after an ROP is executed. Functional units execute an ROP, copy the destination tag onto one of five result tag busses 39, and place a result on a corresponding one of five result busses 32 when the result is available. A functional unit directly accesses a result on result busses 32 when a corresponding tag on result tag busses 39 matches the operand tag of an ROP awaiting the result.

The instruction decoder 18 dispatches opcode information, including an opcode and an opcode type, that accompanies the A and B source operand information via four opcode / type busses 50.

Processor 10 includes several functional units, such as a branch unit 20, an integer functional unit 21, a floating point functional unit 22 and a load / store functional unit 80. Integer functional unit 21 is presented in a generic sense and represents units of various types, such as arithmetic logic units, a shift unit and a special registers unit. Branch unit 20 executes a branch prediction operation, a technique which allows an adequate instruction-fetch rate in the presence of branches and is needed to achieve performance with multiple instruction issue. A suitable branch prediction system, including a branch unit 20 and instruction decoder 18, is described in further detail in U.S. Pat. No. 5,136,697 (William M. Johnson "System for Reducing Delay for Execution Subsequent to Correctly Predicted Branch Instruction Using Fetch Information Stored with each Block of Instructions in Cache"), which is incorporated herein by reference in its entirety.

Processor 10 is shown having a simple set of functional units to avoid undue complexity. It will be appreciated that the number and type of functional units are depicted herein in a specified manner, with a single floating point functional unit 22 and multiple functional units 20, 21 and 22 which generally perform operations on integer data, but other combinations of integer and floating point units may be implemented, as desired. Each functional unit 20, 21, 22 and 80 has respective reservation stations (not shown) having inputs connected to the operand busses 30 and 31 and the opcode / type busses 50. Reservation stations allow dispatch of speculative ROPs to the functional units.

Register file 24 is a physical storage memory including mapped CISC registers for integer and floating point instructions. Register file 24 is addressed by up to two register pointers of the A and B-operand pointers 36 and 37 which designate a register number for source operands for each of up to four concurrently dispatched ROPs. These pointers point to a register file entry and the values in the selected entries are placed onto operand busses of the operand busses 30 and 31 through eight read ports. Integers are stored in 32-bit <31:0> registers and floating point numbers are stored in 82-bit <81:0> floating point registers of the register file 24. Register file 24 receives integer and floating point results of executed and nonspeculative operations from the reorder buffer 26 over four 41-bit writeback busses 34. Results that are written from the reorder buffer 26 to the register file 24 as ROPs are retired.

Reorder buffer 26 is a circular FIFO for keeping track of the relative order of speculatively executed ROPs. The reorder buffer 26 storage locations are dynamically allocated for sending retiring results to register file 24 and for receiving results from the functional units. When an instruction is decoded, its destination operand is assigned to the next available reorder buffer location, and its destination register number is associated with this location, in effect renaming the destination register to the reorder buffer location. The register numbers of its source operands are used to access reorder buffer 26 and register file 24 simultaneously. If the reorder buffer 26 does not have an entry whose destination pointer matches the source operand register number, then the value in the register file 24 is selected as the operand. If reorder buffer 26 does have one or more matching entries, the value of the most recently allocated matching entry is furnished if it is available. If the result is unavailable, a tag identifying this reorder buffer entry is furnished on an operand tag bus of A and B-operand tag busses 48 and 49. The result or tag is furnished to the functional units over the operand busses 30, 31 or operand tag busses 48, 49, respectively. When results are obtained from completion of execution in the functional units 20, 21, 22 and 80, the results and their respective result tags are furnished to the reorder buffer 26, as well as to the reservation stations of the functional units, over five bus-wide result busses 32 and result tag busses 39. Of the five result and result tag and status busses, four are general purpose busses for forwarding integer and floating point results to the reorder buffer. Additional fifth result and result tag and status busses are used to transfer information, that is not a forwarded result, from some of the functional units to the reorder buffer. For example, status information arising from a store operation by the load / store functional unit 80 or from a branch operation by the branch unit 20 is placed on the additional busses. The additional busses conserve result bus bandwidth. Reorder buffer 26 handles exceptions and mispredictions, and maintains the state of certain registers, including a program counter and execution flags. A suitable unit for a RISC core, including a reorder buffer is disclosed in U.S. patent application Ser. No. 08/146,382 filed on Oct. 29, 1993 (David B. Witt and William M. Johnson, "High Performance Superscalar Microprocessor," abandoned and continued as U.S. patent application Ser. No. 08/501,243), which is incorporated by reference in its entirety.

The instruction decoder 18 dispatches ROPs "in-order" to the functional units. The order is maintained in the order of reorder buffer entries. The functional units queue ROPs for issue when all previous ROPs in the queue have completed execution, all source operands are available either via the operand busses or result busses, and a result bus is available to receive a result. Thus, functional units complete ROPs "out-of-order". The dispatch of operations does not depend on the completion of the operations so that, unless the processor is stalled by the unavailability of a reservation station queue or an unallocated reorder buffer entry, instruction decoder 18 continues to decode instructions regardless of whether they can be promptly completed.

It is preferable to define a data path having at least 32 bits of width for handling integer data. The data path includes registers in the register file 24 and a result field in each entry of the reorder buffer 26, as well as the operand, result and writeback busses. In one embodiment, the processor has a 41-bit data path to accommodate floating point operations. The 32-bit data path is mapped into bits <31:0> of a 41-bit structure. This embodiment is described in concurrently filed U.S. Pat. No. 5,574,928, issued Nov. 12, 1996 (Scott A. White and Michael D. Goddard, "Mixed Integer / Floating Point Fixed Pitch Core"), which is incorporated herein by reference in its entirety.

Figure 2:
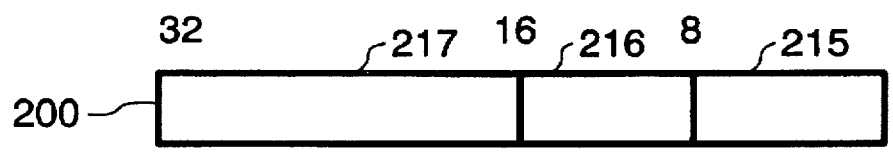
FIGS. 2, 3, 4, 5 and 6 are tables that depict multiple bit fields within an operand utilized by operations performed by the processor of FIG. 1.
Figure 3:
Figure 4:
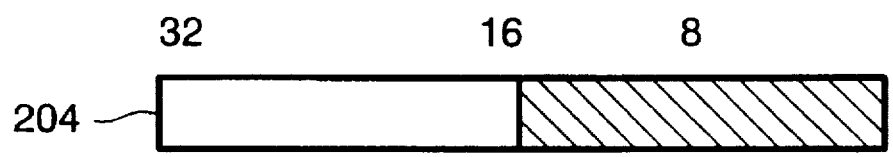
Figure 5:
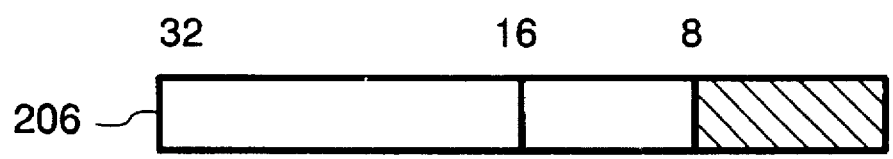
Figure 6:
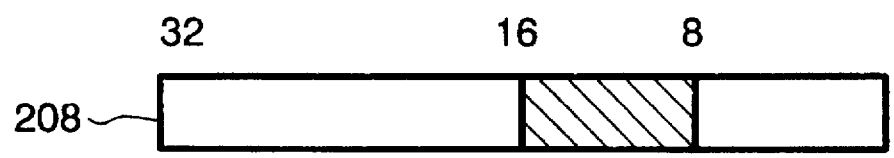

Multiple data types are represented by the 32-bit integer data structure depicted in FIGS. 2, 3, 4, 5 and 6. Data structure 200, shown in FIG. 2, is partitioned into three fields—a 16-bit high field 217, an 8-bit middle field 216 and an 8-bit low field 215. A doubleword 202 shown in FIG. 3 represents a 32-bit integer data element that uses all the bits of the low, middle and high fields of the structure 200. A word 204 shown in FIG. 4 represents a 16-bit integer element that uses all bits of the low and middle fields. Bytes 206 and 208, shown respectively in FIGS. 5 and 6, represent 8-bit integer elements that employ either all bits of the low field to define a low byte, or all bits of the middle field to define a high byte. Unused bits of data elements that are smaller than 32 bits are generally set to zero by various functional blocks within the processor 10.

Figure 7:
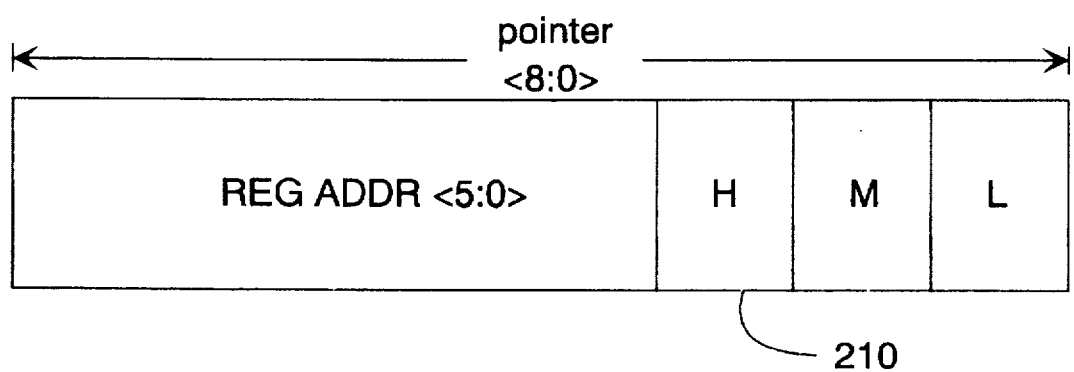
FIG. 7 depicts control bits of a pointer which selects a register of a register file.

Each A-operand pointer, B-operand pointer and destination register pointer is encoded in nine bits, as is shown by the pointer 210 of FIG. 7. The high order six bits <8:3> of the pointer 210 specify a register address which selects a particular register within the register file 24 that is operated upon by an ROP. The low order three bits (H, M and L) are field select bits which specify the fields of the register that are defined to be utilized by the ROP. The L bit selects the low bit field 215 of the data structure 200 of FIG. 2. The M bit selects the middle bit field 216 and the H bit selects the high bit field 217. In this manner, the pointer 210 supports selection of a bit field, independently of the selection of the other bit fields.

Figure 8:
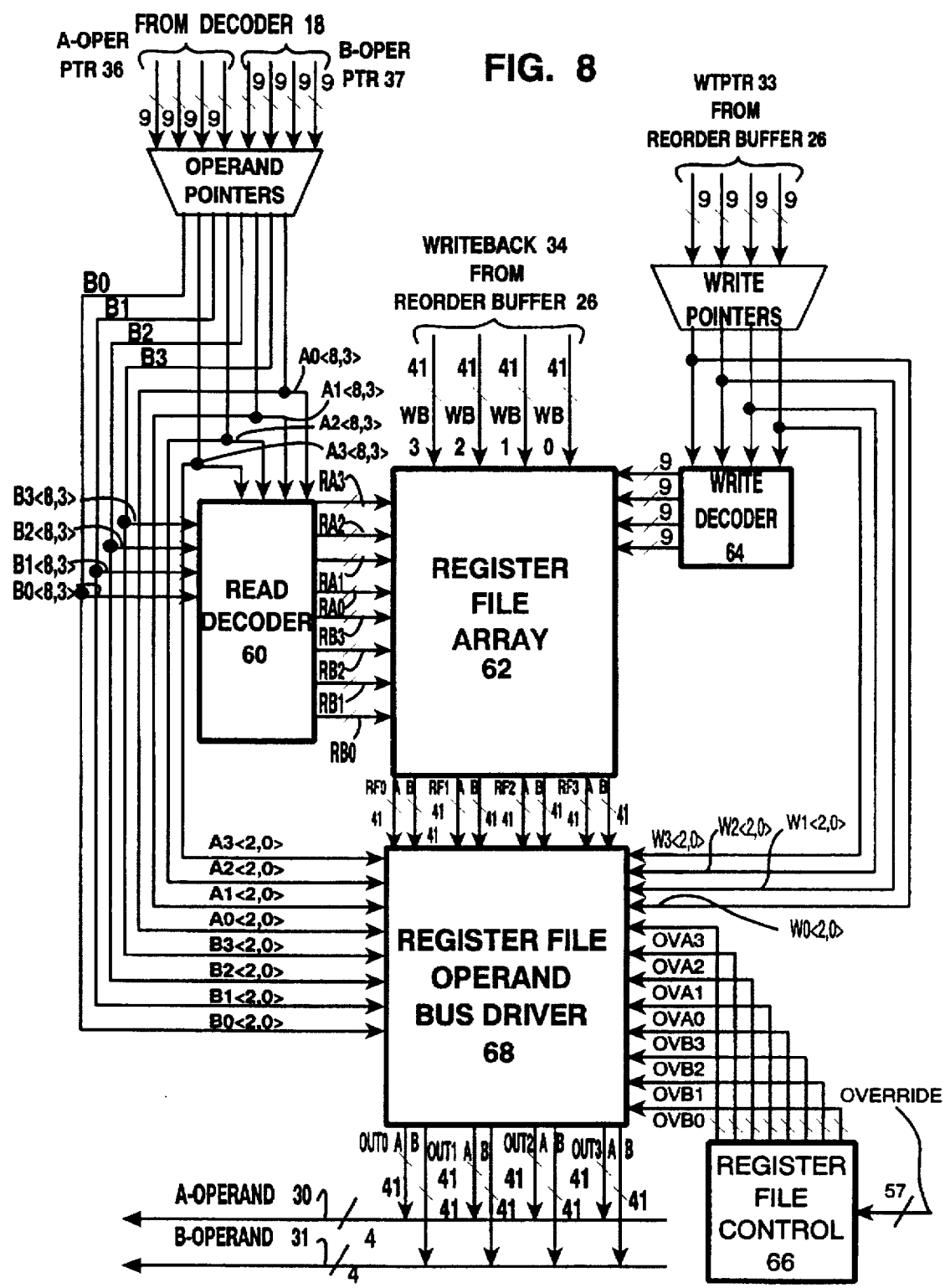
FIG. 8 is an architecture-level block diagram of a register file within the processor of FIG. 1.

A detailed illustration of the register file 24 is shown in FIG. 8. The register file 24 includes a read decoder 60, a register file array 62, a write decoder 64, a register file control 66 and a register file operand bus driver 68. The read decoder 60 receives selected bits <8:3> of the A and B-operand pointers 36 and 37 for addressing the register file array 62 via four pairs of 64-bit A and B operand address signals RA0, RA1, RA2, RA3, RB0, RB1, RB2 and RB3. The remainder of the A and B-operand pointer bits <2:0> are applied to the register file operand bus driver 68 to drive appropriate fields of operand data.

The register file array 62 receives result data from the reorder buffer 26 via the four writeback busses 34. When a reorder buffer entry is retired in parallel with up to three other reorder buffer entries, result data for the entry is placed on one of the writeback busses 34 and the destination pointer for that entry is placed on a write pointer 33 that corresponds to the selected writeback bus. Data on writeback busses 34 are sent to designated registers in the register file array 62 in accordance with address signals on write pointers busses 33 which are applied to the write decoder 64.

The register file control 66 receives override signals on A operand override lines 57 and B operand override lines 58 from the reorder buffer 26, which are then conveyed from the register file control 66 to the register file operand bus driver 68. The register file array 62 includes multiple addressable storage registers for storing results operated upon and generated by processor functional units. FIG. 9 shows an exemplary register file array 62 with forty registers, including eight 32-bit integer registers (EAX, EBX, ECX, EDX, ESP, EBP, ESI and EDI), eight 82-bit floating point registers FP0 through FP7, sixteen 41-bit temporary integer registers ETMP0 through ETMP15 and eight 82-bit temporary floating point registers FTMP0 through FTMP7 which, in this embodiment, are mapped into the same physical register locations as the temporary integer registers ETMP0 through ETMP15.

Figure 10:
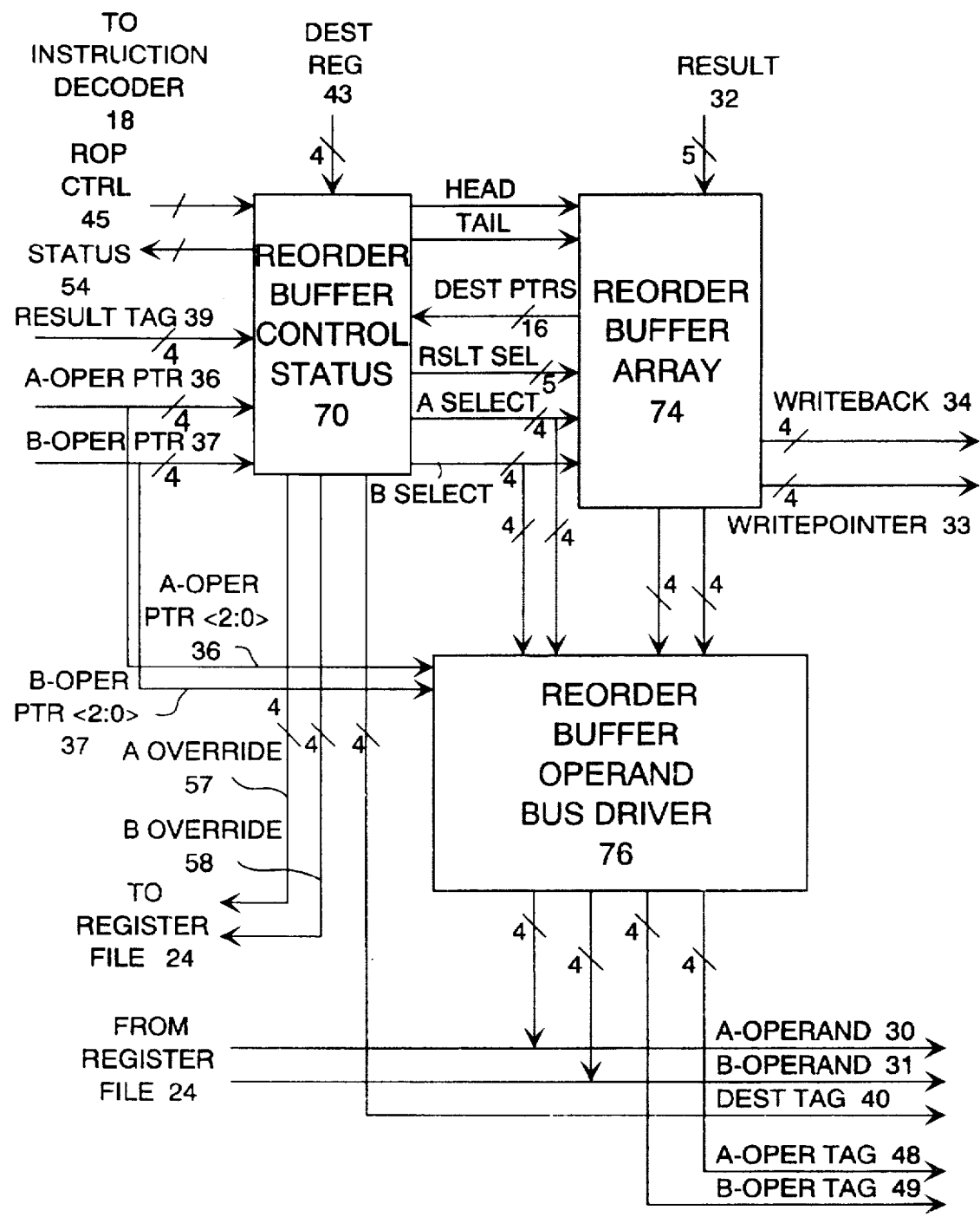
FIG. 10 is an architecture-level block diagram of a reorder buffer within the processor of FIG. 1.

Referring to FIG. 10, reorder buffer 26 includes a reorder buffer (ROB) control and status block 70, a ROB array 74, and a ROB operand bus driver 76. ROB control and status block 70 is connected to the A and B-operand pointers 36 and 37 and the destination pointer (DEST REG) busses 43 to receive inputs which identify source and destination operands for an ROP. ROB array 74 is a memory array which is controlled by ROB control and status block 70. ROB array 74 is connected to the result busses 32 to receive results from the functional units. Control signals, including a head, a tail, an A operand select, a B operand select and a result select signal, are conveyed from ROB control and status 70 to ROB array 74. These control signals select ROB array elements that are input from result busses 32 data and output to writeback busses 34, write pointers 33, A and B-operand busses 30 and 31, and A and B-operand tag busses 48 and 49. Sixteen destination pointers, one for each reorder buffer array element, are conveyed from ROB array 74 to ROB control and status 70 for performing dependency checking.

Figure 11:
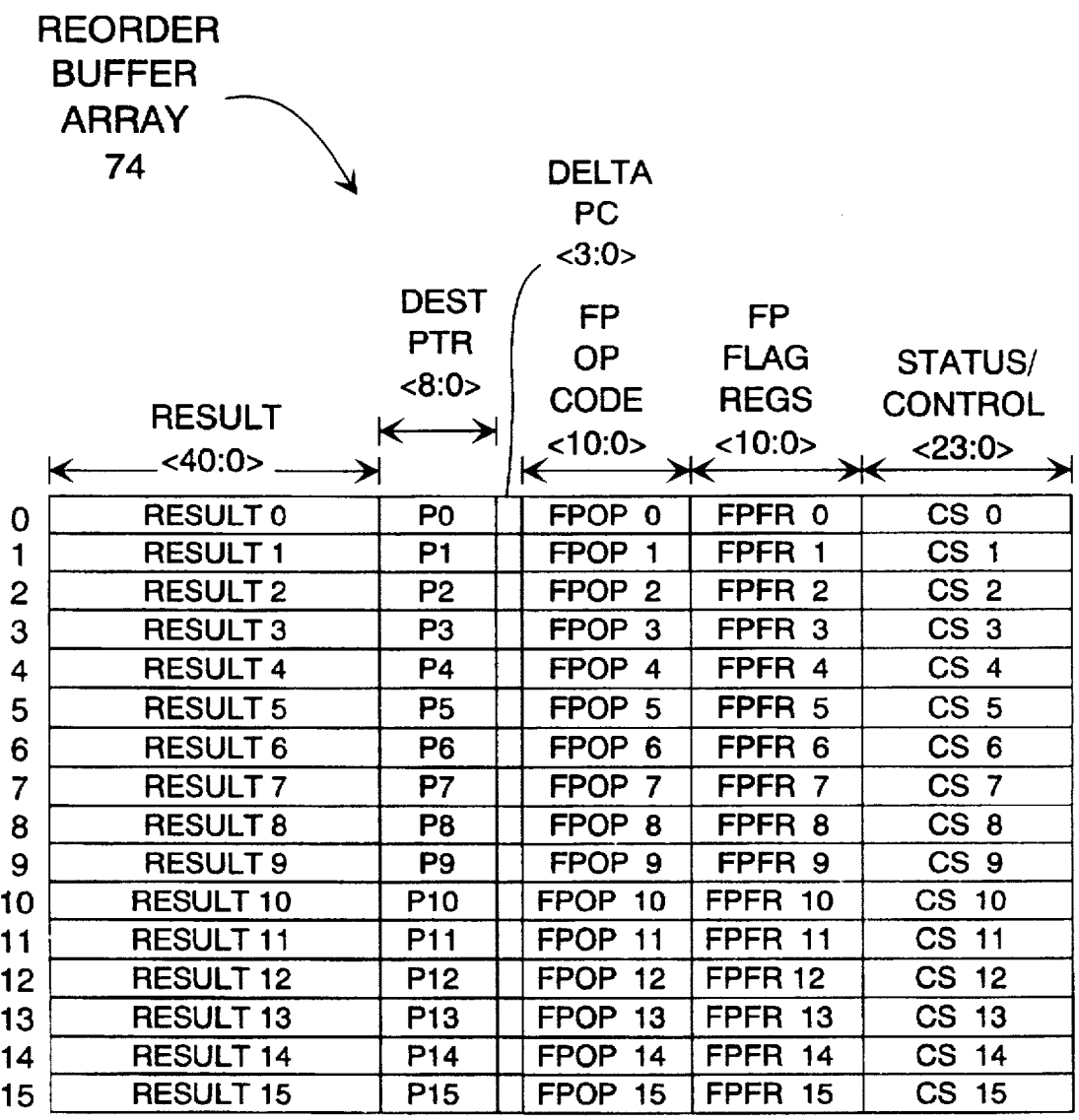
FIG. 11 is a pictorial illustration of a memory format within the reorder buffer of FIG. 10.

FIG. 11 depicts an example of a reorder buffer array 74 which includes sixteen entries, each of which includes a result field, a destination pointer field and other fields for storing control information. A 41-bit result field is furnished to store results received from the functional units. Two reorder buffer entries are used to store a floating point result. Integer results are stored in 32 of the 41 bits and the remaining nine bits are used to hold status flags. The destination pointer field (DEST_PTR<8:0>) of each ROB array 74 entry designates a destination register in register file 24.

The operation of the reorder buffer 26 and register file 24 in combination is described with reference to FIGS. 8, 9, 10 and 11. As the instruction decoder 18 dispatches ROPs, it provides source operand pointers to the register file 24 and the reorder buffer 26 to select the contents of a register or a reorder buffer entry for application to the operand busses as a source operand using the four pairs of A and B-operand pointers 36 and 37. In a similar manner, the instruction decoder 18 provides a destination pointer to the reorder buffer 26 to identify a particular destination register of the thirty destination registers in the register file 24, using the four destination register (DEST_REG) pointer busses 43. The destination register is selected to receive the result of an executed ROP.

When an ROP is dispatched, an entry of the reorder buffer 24 is allocated to it. The entry includes a result field to receive result data from the functional units. The result field of each entry is defined as a doubleword field, a word field, a high byte field, or a low byte field, and receives a corresponding field of the result data when it becomes available upon execution of an ROP. For a doubleword operand field, the 16-bit high field, the 8-bit middle field, and the 8-bit low field are all defined, as indicated by set bits 217, 216 and 215 respectively. For a word operand field, only the 8-bit middle field and the 8-bit low field are defined, as indicated by set bits 216 and 215 respectively. For a low byte operand field, only the 8-bit low field is defined, as indicated by set bit 215. For a high byte operand field, only the 8-bit middle field is defined, as indicated by set bit 216. The destination pointer DEST_PTR, which contains the register address in DEST_PTR<8:3> and the defined field bits 217, 216 and 215 in DEST_PTR<2:0>, is received by the reorder buffer control status 70 over destination register (DEST_REG) busses 43, and written into the destination pointer field DEST_PTR<8:0> of the allocated entry of the reorder buffer array 74.

The pointer of the A or B-operand pointers 36 and 37 addresses the ROB array 74, through the ROB control block 70, to designate the operand data to be applied to the ROB operand bus driver 76. ROB control and status 70 receives the operand pointers via the A and B-operand pointers 36 and 37.

The reorder buffer 26 accomplishes dependency checking by simultaneously comparing each of the pointers of A and B-operand pointers 36 and 37 to the destination pointer fields of all sixteen elements of reorder buffer array 74 to determine whether a match, which identifies a data dependency, exists. Up to eight operand pointers are simultaneously compared to the destination pointers. For the high, operand field bits <8:3,2> of the operand pointer are compared to bits <8:3,2> of the sixteen destination pointer fields. For the middle operand field, bits <8:3,1> of the operand pointer are compared with bits <8:3,1> of the sixteen destination pointer fields. For the low operand field, bits <8:3,0> of the operand pointer are compared with bits <8:3,0> of the sixteen destination pointer fields. A match for a particular field occurs when the operand pointer bits <8:3> match the destination pointer bits <8:3> and the field select bit identifying the particular field is asserted in both the operand pointer bits <2:0> and the destination pointer bits <2:0>. An operand pointer may match destination pointers for multiple reorder buffer entries. When one or more matches occur, a pointer to the matching reorder buffer entry closest to the tail of the queue is used to identify the appropriate operand data. This pointer is called an operand tag. The reorder buffer 26 furnishes three operand tags for each operand, one for each field of the high, medium and low operand fields. The operand tags are applied as pointers to the reorder buffer entries to drive result data onto an operand bus. The high, medium and low field select bits of the operand pointer drive the reorder buffer result data respectively onto bits <31:16>, <15:8> and <7:0> of the operand bus.

The status and control field <23:0> of the reorder buffer array 74 includes a result valid bit which is asserted when the reorder buffer 26 receives a result from a functional unit. The result valid bit applies to all of the high, medium and low fields of the result. Simultaneously for the three fields, the ROB control block 70 addresses the ROB array 74 using the field-specific operand tags as pointers. The ROB array 74 furnishes appropriate bits of the result field of the entry to the ROB operand bus driver 76. A and B-operand pointer bits <2:0> are applied to the ROB operand bus driver 76 to define the H, M and L bit fields to be driven onto the operand busses. Fields that are not defined are driven as zeros onto an operand bus.

As the instruction decoder 18 drives opcodes onto the opcode/type busses 50 and the reorder buffer 26 drives operands onto the operand busses 30 and 31, the reorder buffer 26 also drives the operand tags for each of the high, medium and low operand fields onto the operand tag busses 48 and 49. The three operand tags each include an identifier of the reorder buffer entry from which a source operand is sought, regardless of whether the data is available. An operand tag valid bit is associated with each of the high, medium and low field operand tags. An operand tag valid bit is asserted to indicate that operand data is not available. The operand tag valid bit is obtained for a reorder buffer entry by inverting the result valid bit of the entry. Thus, there are three independent tags in the A and B-operand tag busses 48 and 49 associated with each operand bus 30 and 31 that supply tagging information for the low, middle and high data fields. Each of the high, medium and low operand tags is independent of the other tags so that, for the different fields, data may be driven onto operand busses from different reorder buffer entries, the same entry or data may not be driven from an entry.

In the event that a particular field of an operand is driven by the register file 24, the ROB 26 does not assert the corresponding operand tag valid bit, thereby indicating that operand data for the particular field is available. A suitable dependency checking circuit is described in detail in U.S. patent application Ser. No. 08/233,568 filed on even day herewith (Scott A. White, "A Range-Finding Circuit using Circular Carry Lookahead"), which is hereby incorporated by reference.

The reorder buffer 26 sends override signals whenever it detects a dependency, whether the result is held in the result field of the reorder buffer entry or the result is unavailable awaiting execution of an ROP. In either case, the reorder bus control 70 sets override signals for each dependent field of an operand to the register file 24 via an appropriate one of A override lines 57 or B override lines 58. The reorder buffer control 70 overrides the read operation of any dependent low, middle or high fields of a register file array 62 entry by setting bits of the override busses 57 and 58 that are applied to the register file operand bus driver 68. The A override busses 57 and the B override busses 58 include three forwarded-operand bits for each of the four A and B-operand busses 30 and 31. The reorder buffer 26 controls overriding of any data fields and the register file 24 responds by disabling the register file operand bus driver 68 as instructed. Thus, an attempt to place data from the register file 24 onto an operand bus is overridden, but only for the operand fields for which a dependency exists.

The read decoder 60 receives the A and B-operand pointers 36 and 37 and decodes operand pointer 36 and 37 to select registers in the register file 24. The read decoder 60 decodes the high six bits of the operand pointer 36 and 37 element to select a register. The value from the accessed register is latched and driven onto one of the four pairs of 41-bit A or B-operand transfer lines connecting the register file array 62 to the register file operand bus driver 68. Bit positions that are not implemented in the integer registers of the register file array 62 are read as logical zeros on these busses. The register file operand bus driver 68 drives the latched values selected in accordance with the H, M and L bit fields defined by bits <2:0> of operand pointers 36 and 37 onto A and B-operand busses 30 and 31. The register file control 66 receives the A and B override signals 57 and 58 from the reorder buffer 26 to direct the override of a register file read operation in any of the low, middle or high fields of the entry.

If the reorder buffer 26 determines that source operand data are not dependent on unavailable data and are therefore available either from the register file 24 or the reorder buffer 26, the operand data are sent via operand busses 30 and 31 to the functional unit reservation stations.

As functional units complete execution of operations and place results on the result busses 32, ROB control and status 70 receives pointers from the result tag busses 32 which designate the corresponding ROB array entries to receive data from the result busses 32. ROB control 70 directs the transfer of data from the result busses 32 to the ROB array 74 using four result select pointers.

ROB control and status 70 retires an ROP, communicating the result to the register file 24, by placing the result field of an ROB array 74 element on one of the writeback busses 34 and driving the write pointer 33 corresponding to the writeback bus with the destination pointer. Write pointer 33 designates the register address within register file 24 to receive the retired result.

Figure 12:
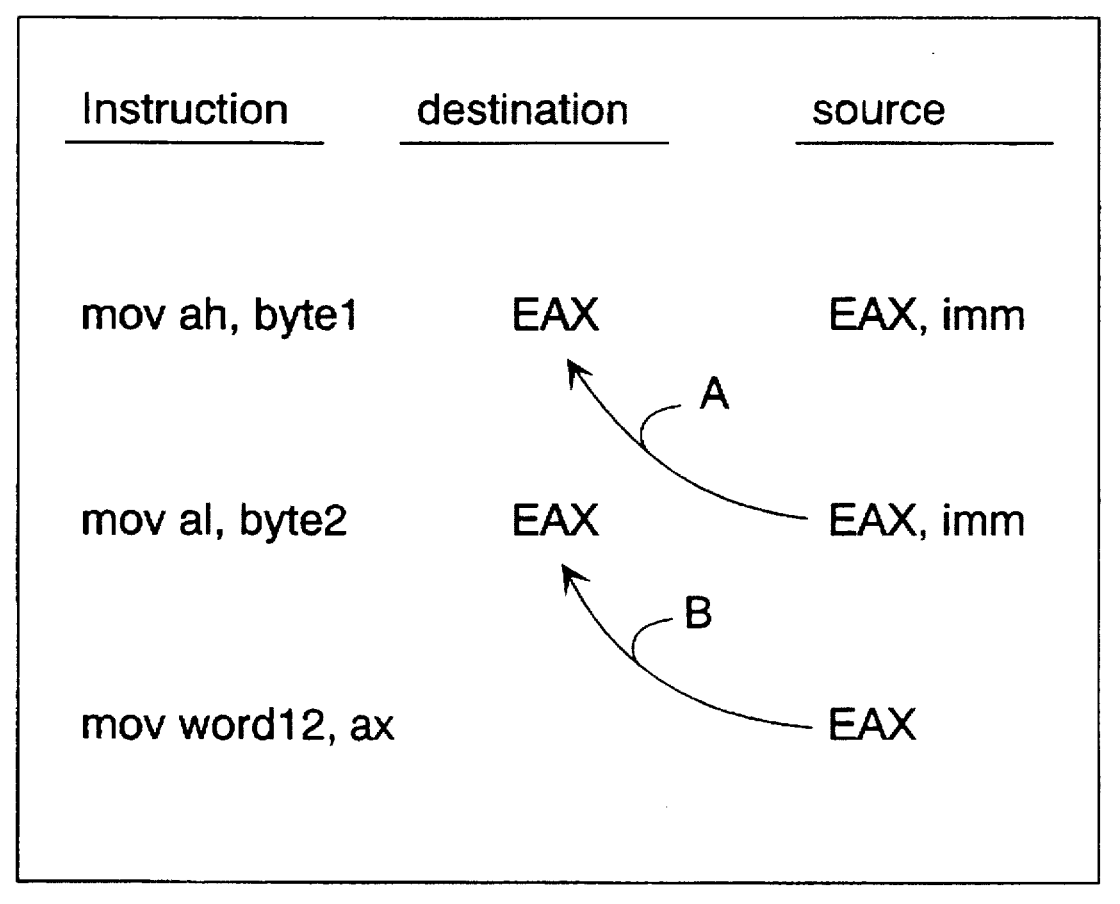

Referring to FIG. 12, without register renaming resource conflicts arise in which a subsequent instruction must wait for the completed execution of a previous instruction to resolve the conflict. This phenomenon is illustrated by the following sequence of x86 instructions:

mov ah,byte1 mov al,byte2 mov word12,ax

This code sequence may be used in a loop to interleave two byte strings or to swap the byte order of 16-bit data. The first instruction loads byte1 into register AH of register EAX. The second instruction loads byte2 into register AL of register EAX. The third instruction stores the AX register contents into a 16-bit memory location, named word12.

In one implementation of register renaming, a modification to any part of the register EAX creates a new instance of the full register. This is appropriate for handling independent operations on the full register in parallel. However, to modify only a part of register EAX, such as in the first and second instructions above, and still be able to forward the full register contents to subsequent operations (the third instruction), the current contents of register EAX must be supplied to the functional unit for merger with the new field value to create the new 32-bit contents of register EAX. This generates a dependency of the second instruction upon the first instruction, shown by arrow A of FIG. 12, so that the instructions execute in a serial manner. The third instruction is dependent upon the second, shown by arrow B, so that none of the three instructions can be executed in parallel.

Furthermore, the destination register becomes a required input operand. Many x86 instructions have a two-operand form in which the destination is also one of the inputs. However, several instructions are defined in which this is not the case and the destination becomes a third input. Since the dependency handling logic must handle any of these cases, a greater burden is placed on the logic that is used only for these few exceptional instructions.

In a preferred implementation of register renaming, shown in FIG. 13, partial fields of a register (EAX) are renamed so that the second instruction does not depend on the first. Only the third instruction is dependent upon a previous instruction so that the first two instructions may execute in parallel and execution of only the third instruction is delayed due to a dependency condition. This preferred implementation of register renaming reduces the total time for the sequence from three cycles to two. Additional acceleration of the processor is accomplished since the data that results from the execution of the first two instructions is placed on the result busses and forwarded for execution of the third instruction.

Figure 14:
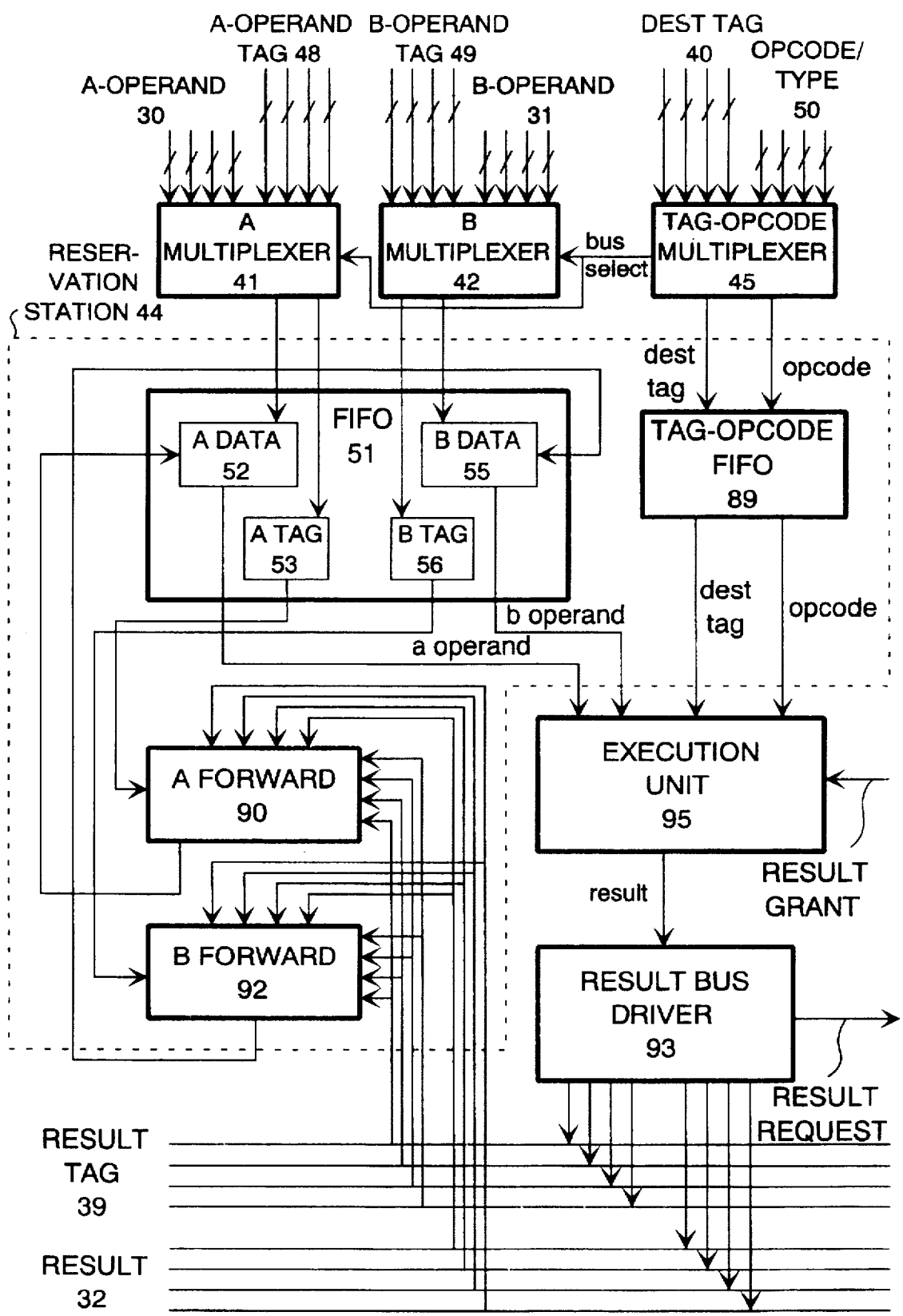
FIG. 14 is an architectural-level block diagram of a generic functional unit which illustrates input and output handling of such a unit.

FIG. 14 illustrates a generic functional unit 22 that incorporates a generally standard set of component blocks and supports operand data having selectable variable bit widths. Functional units may differ from the generic embodiment with respect to various details. For example, a functional unit may have several reservation stations and access more than one set of operand busses and result busses at one time. The generic functional unit 22 includes an A multiplexer 41, a B multiplexer 42 and a tag-opcode multiplexer 45 for receiving input data and control signals. The generic functional unit 22 also includes a reservation station 44, an execution unit 95 and a result bus driver 93. The reservation station 44 includes a FIFO 51, a tag-opcode FIFO 89, an A operand forwarding circuit 90 and a B operand forwarding circuit 92.

The A multiplexer 41 is a 4:1 multiplexer that is connected to the four 41-bit A-operand busses 30 and the four A-operand tag busses 48 to receive respective input operands and operand tags. Similarly, the B multiplexer 42 is a 4:1 multiplexer that is connected to the four 41-bit B-operand busses 31 and the four B-operand tag busses 49. The tag-opcode multiplexer block 45 includes type comparison logic (not shown) and two multiplexers, a tag multiplexer (not shown) that is connected to the four destination tag busses 40 and an opcode multiplexer (not shown) that is connected to the four opcode / type busses 50. The tag multiplexer and the opcode multiplexer are 4:1 multiplexers. The bus select signal connects type comparison logic, the tag multiplexer and the opcode multiplexer internal to the tag-opcode multiplexer block 45 and is connected to the A multiplexer 41 and the B multiplexer 42.

Within the reservation station 44, the tag-opcode FIFO 89 is connected to the tag-opcode multiplexer 45 by destination tag lines and opcode lines that correspond respectively to a selected bus of the destination tag busses 40 and to a selected bus of the opcode / type busses 50. The FIFO 51 is connected to the A multiplexer 41 by a first set of lines that correspond to a selected bus of the A-operand busses 30 and by a second set of lines that correspond to a selected bus of the A-operand tag busses 48. The first set of lines are connected internal to the FIFO 51 to an A data FIFO 52. Internal to the FIFO 51, the A data FIFO 52 has lines which connect to the A operand forwarding circuit 90. The second set of lines are connected internal to the FIFO 51 to an A tag FIFO 53. The FIFO 51 is connected to the B multiplexer 42 by a third set of lines that correspond to a selected bus of the B-operand busses 31 and by a fourth set of lines that correspond to a selected bus of the B-operand tag busses 49. The third set of lines are connected internal to the FIFO 51 to a B data FIFO 55. Internal to the FIFO 51, the B data FIFO 55 has lines which connect to the B operand forwarding circuit 92. The fourth set of lines are connected internal to the FIFO 51 to an B tag FIFO 56. The A operand forwarding circuit 90 is connected to the A tag FIFO 53, the five result tag busses 39 and the five result busses 32. Similarly, the B operand forwarding circuit 92 is connected to the B tag FIFO 56, the five result tag busses 39 and the five result busses 32.

The execution unit 95 is connected to the reservation station 44 using A operand lines from the A data FIFO 52, B operand lines from the B data FIFO 55, and destination tag lines and opcode lines from the tag-opcode FIFO block 89. The execution unit 95 is also connected to a result grant signal input from a result bus arbitrator (not shown). The result bus driver 93 is connected at its outputs to a result request signal line which connects to the result bus arbitrator, the result tag busses 39 and the result busses 32.

The functional unit is activated when a type code match occurs between a dispatched ROP and a functional unit. A type code match takes place when a type code on one of the four type code busses corresponds to the type code assigned to the functional unit. When a type code matches, the tag-opcode multiplexer 45 generates a bus select signal that specifies the particular bus of the operand, operand tag, destination tag and opcode / type busses to be selected. The bus select signal is applied to the tag multiplexer and the opcode multiplexer of the tag-opcode multiplexer 45, the A multiplexer 41 and the B multiplexer 42, directing operand and tag information into the reservation station 44. The selected destination tag and the selected opcode are written into the tag-opcode FIFO 89. The tag FIFO and the opcode FIFO of the tag-opcode FIFO 89 are temporary memories for holding the destination tag as well as the local opcode. The tag identifies the entry within the reorder buffer 26 into which the ROP and its result are eventually written after the instruction is executed and its result is placed on the result busses 32. Thus, the A and B operands, A and B operand tags, the destination tag and the opcode are held in the reservation station 44 and pushed through the FIFO 51 and tag-opcode FIFO 89 for each reservation station entry.

Figure 15:
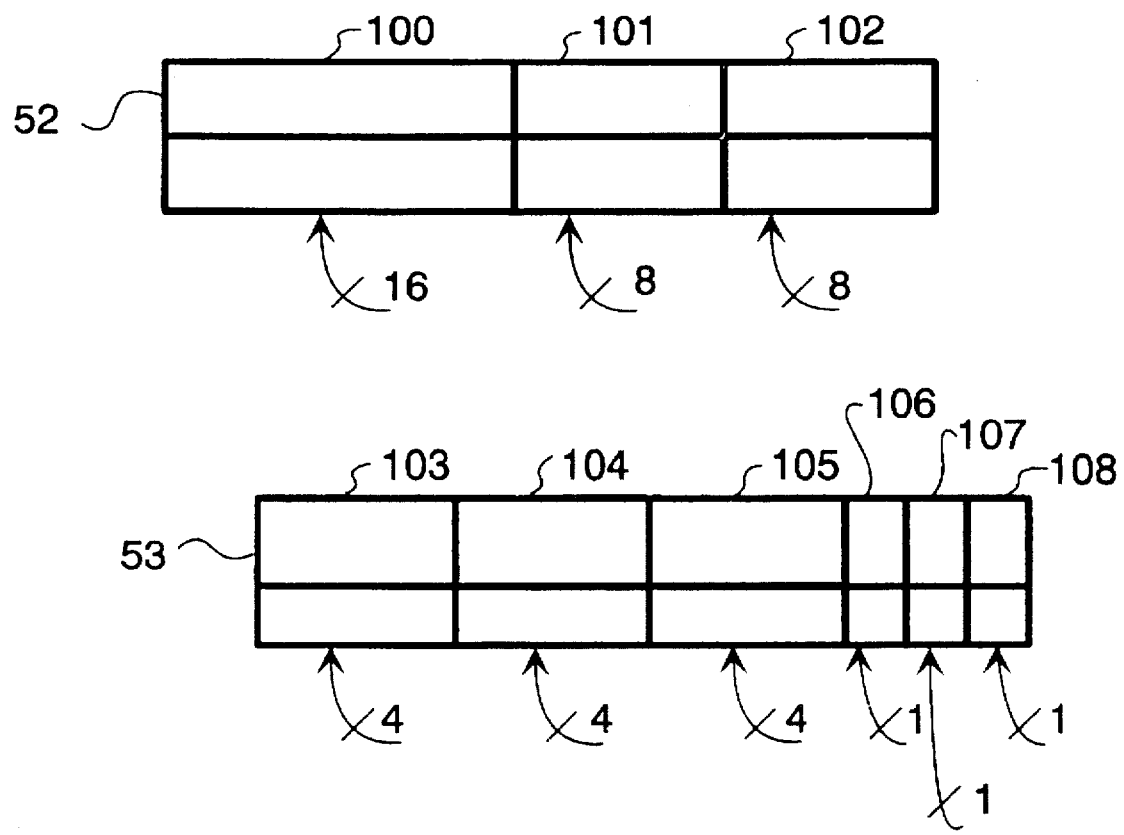
FIG. 15 is a pictorial illustration of a FIFO format within a reservation station of the functional unit of FIG. 14.

The selected A operand data and A operand tag are respectively written into the A data FIFO 52 and the A tag FIFO 53. The selected B operand data and B operand tag are respectively written into the B data FIFO 55 and the B tag FIFO 56. Each of the A tag 53 and B tag 56 entries in the FIFO 51 includes three operand tags corresponding to the high, medium and low fields of an operand. As shown generally in FIG. 15, each of the high, medium and low operand fields 100, 101 and 102 have an associated operand tag valid bit 106, 107 and 108. Operand tag valid bits from the operand tag bus are directed through a multiplexer to a tag FIFO in the FIFO 51. A tag FIFO entry includes the high, medium and low operand tags 103, 104 and 105, which are written into the tag FIFO together. The tag FIFO also includes the operand tag valid bits 106, 107 and 108 which indicate for each field, when set, that operand data is not available. Thus, if a field is defined and data is not available in the register file 24 or reorder buffer 26, the reorder buffer 26 drives onto the operand tag bus an asserted operand tag valid bit, accompanied by the operand tag which identifies the reorder buffer entry into which the unavailable data is written when it becomes available. If a field is undefined with respect to the ROP or data is available, the operand tag valid bit for that field is nonasserted.

The purpose of a reservation station is to allow an instruction decoder to dispatch speculative ROPs to functional units regardless of whether source operands are currently available. This allows a number of speculative ROPs to be dispatched without waiting for a calculation or a load / store to complete. The A data 52, A tag 53, B data 55, B tag 56, and destination tag and opcode FIFOs of the tag-opcode FIFO block 89 are two-deep FIFOs so that the reservation station 44 can hold two source operands and tags plus the information on the destination and opcode in each of the entries.

The reservation station 44 also forwards source operands that were unavailable at dispatch directly from the result busses 32 using the operand tags and the operand tag valid bits stored therein. When all appropriate A and B operand data fields are present in FIFO 51, the functional unit arbitrates for a bus of the result busses 32 using a result request signal from the result bus driver 93.

When a result bus is available and the result grant signal is asserted, the execution unit 95 executes the ROP and conveys result data to the result bus driver 93. Depending on the type of functional unit, the execution unit 95 executes one or more operations of a variety of operations that are standard in processors, including integer or floating point arithmetic, shifting, data load/store operations, data comparison and branching operations, and logic operations, for example.

The execution unit 95 also arranges the data for output to the result busses 32. For single-byte operand opcodes, a one-bit AHBYTE (high byte) signal determines whether an 8-bit register operand is a high byte or a low byte, residing in the middle M or low L register fields, respectively, as is shown by the data structure 200 of FIG. 2. If the AHBYTE signal is set, execution unit 95 locally remaps data in the middle field (bits<15:8>) into the low bit field position (bits<7:0>) before executing an ROP. The remapping operation includes the operations of sign extending or zero extending the remapped high bytes, in accordance with the specified operation. High bytes are always read from the middle field from the register file 24, the reorder buffer 26, the operand busses 30 and 31 and the result busses 32. The high byte is remapped locally by functional units that perform right-justified operations.

The result bus driver 93 drives the result data onto the available 41-bit result bus and the corresponding entries in the reservation station data, operand tag, destination tag and opcode FIFOs are cleared. The result bus driver 93 drives the destination tag from the destination tag FIFO onto the result tag bus that is associated with the available result bus. In addition to the destination tag, the result bus driver 93 sets status indication signals on the result bus including normal, valid and exception flags, for example.

The A operand forwarding circuit 90 and the B operand forwarding circuit 92 monitor the result tag busses 39 to detect a result that satisfies a data dependency that is delaying execution of an ROP within the FIFO 51. A result tag identifies the reorder buffer entry into which the result is written. The A operand forwarding circuit 90 monitors the result tag busses 39 and compares the result tags carried thereon to a tags from the A tag FIFO 53. In this monitoring operation, the forwarding circuit compares each of the high, medium and low-order operand tags to the result tag ROB entry identifier. Although all three fields are tested simultaneously, each of the three fields is tested independently of the other fields.

For each field, when the field-specific operand tag matches the result tag, a data dependency is resolved for that field. The result data for the field is forwarded into the corresponding data FIFO entry and written into the bits of the field. The operand tag valid bit for the corresponding tag FIFO entry and field is cleared to indicate that the data dependency relating to that field is resolved.

When data dependencies are resolved for all fields of all source operands of an ROP, and the functional unit is not busy and a result bus is available, the ROP is executed. In a similar manner, the B operand forwarding circuit 92 monitors the result tag busses 39 and compares the result tags carried thereon to a tag from the B tag FIFO 56. The result bus driver 93 always drives a result onto a result bus with each field appropriately positioned so that data is consistently presented in the correct position when data is forwarded to the reservation station 44.

Figure 16:
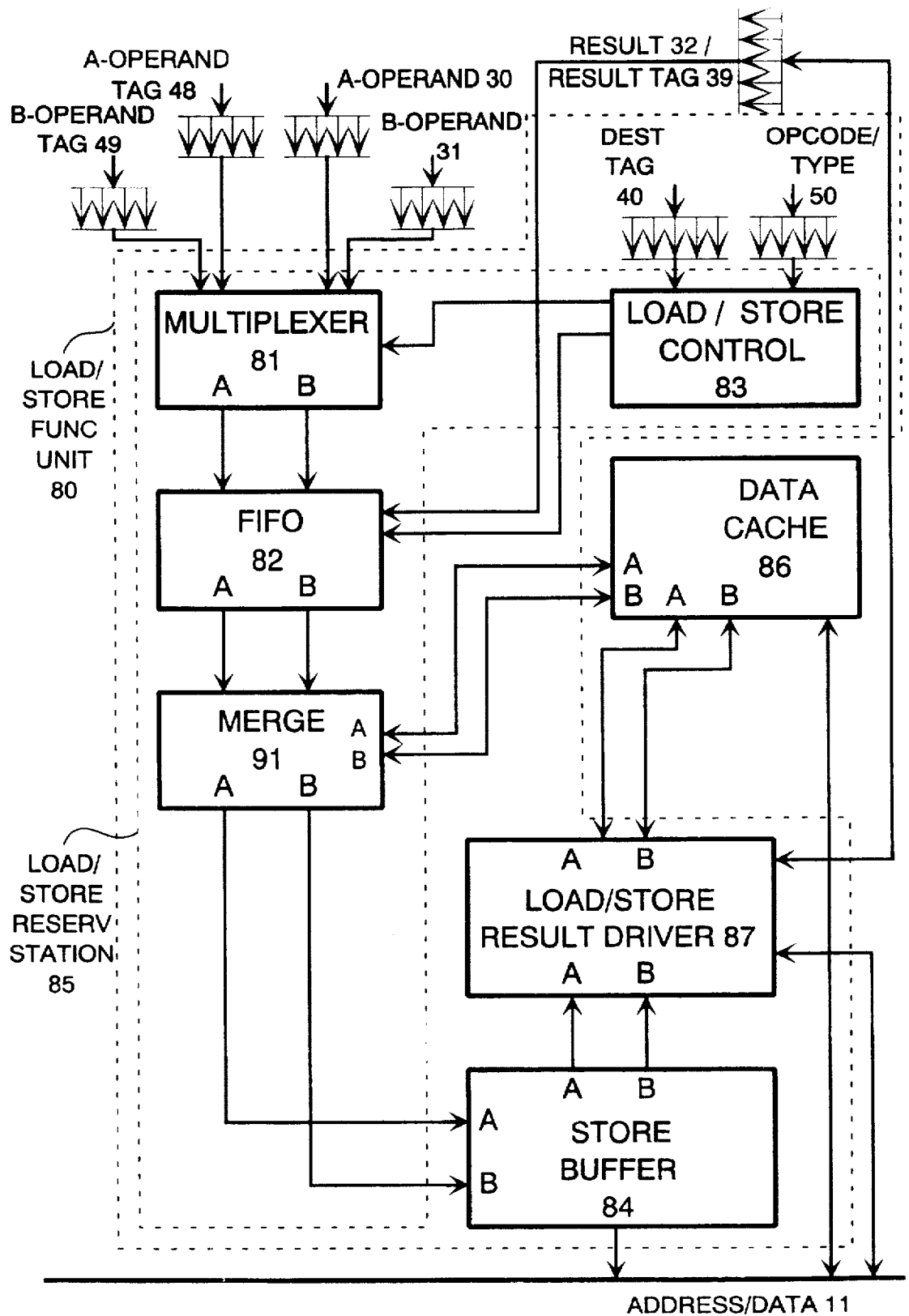
FIG. 16 is an architectural-level block diagram of a load / store functional unit within the processor of FIG. 1.

Referring to FIG. 16, load/store functional unit 80 executes LOAD and STORE instructions and interacts with the data cache 86. Load/store functional unit 80 includes a dual-ported reservation station 85, a four-entry store buffer 84 and a load/store result bus driver 87. Each port is connected to the store buffer 84 and the data cache 86 by a channel, which includes 40 data bits and a suitable number of address bits. The reservation station 85 includes a multiplexer 81, a load store controller 83, a merge circuit 91 and a FIFO 82 for queuing up to four ROPs.

The multiplexer 81 includes 4:1 multiplexers that are connected to the A and B-operand and tag busses 30, 31, 48 and 49. Each FIFO entry in the reservation station 85 holds all of the information fields that are necessary to execute a load or store operation. In one processor clock cycle, up to two ROPs are issued and up to two FIFO entries are retired. The load/store reservation station 85 is connected, at its inputs, to the four A and B operand busses 30 and 31, the four A and B operand tag busses 48 and 49, the five result busses 32, the four destination tag busses 40 and the four opcode/type busses 50. The reservation station 85 is also connected to the data portions of ports A and B of data cache 86. Reservation station 85 is connected to store buffer 84 using A and B port reservation station data busses RSDATA A and RSDATA B, respectively, and A and B port reservation station address busses RSADDR A and RSADDR B, respectively, which are also connected to the address lines of ports A and B of the data cache 86. Reservation station 85 is connected to controller 83 using a reservation station load bus RSLOAD and a reservation station shift bus RSHIFT. The store buffer 84 is connected to the load/store result bus driver 87, the address/data bus 11, and the load store controller 83 using a store buffer load bus SBLOAD and a store buffer shift bus SBSHIFT. In addition to connections with reservation station 85 and store buffer 84, load store controller 83 is connected to data cache 86 and reorder buffer 26. In addition to connections to store buffer 84, the load/store result bus driver connects to the data cache 86 and to the five result busses 32 and the five result tag busses 39.

Data cache 86 is a linearly addressed 4-way interleaved, 8 Kbyte 4-way set associative cache that supports two operations per clock cycle. Data cache 86 is arranged as 128 sixteen byte entries. Each 16 byte entry is stored in a line of four individually addressed 32-bit banks. Individually addressable banks permit the data cache 86 to be accessed concurrently by two ROPs, such as two simultaneous load operations, while avoiding the overhead identified with dual porting.

A load operation reads data from the data cache 86. During a load operation, reservation station 85 supplies an address to data cache 86. If the address generates a cache hit, data cache 86 furnishes the data which is stored in a corresponding bank and block of a store array (not shown) of the data cache 86 to reservation station 85. A doubleword is transferred from the data cache 86 to the load/store result bus driver 87. The upper two bits of the load/store instruction opcode specify the size of the result to be produced. The types of results are doublewords, words, high bytes or low bytes. Unused bits are set to zero. For high bytes, the result produced by executing the ROP is remapped into the middle bit field before the result is driven onto the result busses 32 by the load/store result bus driver 87. High bytes are always read from the middle bit field of the operand. Load/store result bus driver 87 masks unused portions of data that are read by the doubleword read operation. If the AHBYTE signal is set, the load/store result bus driver 87 remaps the low field data bits <7:0> into the middle field bits <15:8>. The bus driver 87 then drives the result on one of the result busses 32. If the address was supplied to data cache 86 over port A, then the data is provided to reservation station circuit 85 via port A. Otherwise, if the address was presented to data cache 86 Using port B, then the data is communicated to reservation station 85 using port B. Addresses are communicated to data cache 86 and data is received from data cache 86 using ports A and B simultaneously. As the load/store result bus driver 87 drives the result onto one of the result busses 32, it also drives the corresponding one of the result tag busses 39.

A store operation is a doubleword read operation from data cache 86, followed by a doubleword write back to the cache 86. During a store operation, an addressed doubleword is first transferred from data cache 86 to store buffer 84. Then the data is communicated from reservation station 85 to store buffer 84. If the store data is 32 bits or more in width, the data replaces the doubleword that was read from data cache 86. If the store data is less than 32 bits in width, the merge circuit 91 merges the applicable data fields into the doubleword that was read from data cache 86. If a portion of the store data is not available, then an operand tag is used to replace the unavailable data. The mix of data and tags is held in the store buffer until all bit fields of missing data are forwarded from the result busses. By holding partial data in the store buffer 84 until all fields are available, only full doublewords are written to cache 86. Writing of individual 8-bit bytes is not necessary. The merged data is then communicated back to the data cache 86 by the load / store result bus driver 87. Load and store operations of store data that are greater than 32 bits in width execute multiple accesses to the data cache 86 and construct the data in store buffer 84 before writing it back to the data cache 86. When the store operation is released, the data and corresponding address are communicated using address/data bus 11 to data cache 86.

A suitable load/store functional unit is disclosed in U.S. patent application Ser. No. 08/146,376 filed on Oct. 29, 1993 (William M. Johnson et al. now abandoned, "High Performance Load/Store Functional Unit and Data Cache"), which is incorporated herein by reference in its entirety.

While the invention has been described with reference to particular embodiments, it will be understood that the embodiments are illustrative and that the invention scope is not so limited. Many variations, modifications, additions and improvements to the embodiment described are possible. For example, the invention may be implemented on a processor other than an x86 architecture processor or a CISC architecture processor. Also, the bit width of the data path may be different from 32 bits or 41 bits. The data path may be partitioned into more or fewer fields than three. The number of bits in the various structures and busses is illustrative, and may be varied. The size of the register file and the reorder buffer, the number of operand buses and operand tag busses, the number of result buses, the number of writeback buses, and the type and number of functional units are illustrative, and may be varied. The invention may be practiced in a processor that is not a superscalar processor or a pipelined processor, although the advantages of the invention are greater in a superscalar implementation. These and other variations, modifications, additions and improvements may fall within the scope of the invention as defined in the following claims.

What is claimed is:

1. A method of associating operand data fields in a processor which executes operations utilizing operands of a variable size, the method comprising the steps of:

defining a plurality of operand fields within an operand;

designating each defined field as operative or inoperative with respect to the operation;

detecting data dependencies of each of the operative fields, independently of the other defined fields; and forwarding result data for utilization by the operation when the result data becomes available for each of the data dependent fields independently of the other defined fields.

2. A method according to claim 1, further comprising the steps of:

executing an operation to produce result data;

storing the result data in one of a plurality of memory elements; and utilizing data stored in a memory element for each non-dependent field independently of the other fields.

3. A method according to claim 1, wherein operands are source operands that are operated upon by an operation and destination operands that are generated by an operation, further comprising the steps of:

tagging each operative field of a first operation's destination operand independently of the other fields with a destination tag that identifies a memory element receiving the result data of the operation; and tagging each operative field of a source operand of a second operation independently of the other fields with a source tag that identifies a memory element which supplies the operand data of the operation, wherein the dependency detecting step includes the steps of:

comparing the destination tag to the source tag, and forwarding the result data when the tags mutually correspond for each defined field independently of the other fields.

4. A method of handling operand data in a processor which executes operations utilizing operands of a variable size, comprising the steps of:

17 partitioning an operand utilized by an operation into a plurality of fields;

designating each partitioned field as defined or undefined with respect to the operation;

detecting data dependencies of each of the defined fields, independently of the other partitioned fields.

5. A superscalar processor for executing a plurality of instructions concurrently and out-of-order, the processor comprising:

a reorder buffer array including a plurality of array elements, the array elements including a result field and a destination pointer field, the result field having a plurality of bits arranged in a plurality of sub-fields, some of the sub-fields being overlapping, the destination pointer having a destination register field designating a destination register in a register file that is to receive data from the result field when the data is retired and a sub-field identifier designating the sub-fields in the destination register that are defined for a particular instruction;

a decoder coupled to the reorder buffer array via a plurality of operand pointer buses, the decoder decoding instructions, generating operand pointers based on the decoding operation, and driving the operand pointers on the operand pointer buses, the operands having a source register field designating a source register in the register file and a sub-field identifier designating sub-fields in the source register that are defined for the particular instruction; and a dependency check comparator coupled to the reorder buffer and coupled to the operand pointer buses, the dependency check comparator detecting a dependency when the source register field for a defined sub-field matches a defined sub-field of a destination register in the plurality of array elements in the reorder buffer array.

6. A superscalar processor according to claim 5, further comprising:

a functional unit coupled to the reorder buffer array via an operand bus supplying operands corresponding to source operands, and coupled to the dependency check comparator via an operand tag bus supplying operand tags corresponding to identifiers of dependent source operands, the operands being defined for one or more subfields and the operand tags designating a data dependency for the corresponding one or more sub-fields.

7. A superscalar processor according to claim 5, further comprising:

a functional unit coupled to the reorder buffer array, the functional unit executing instructions, generating a result and a result valid signal at completion of successful execution of an instruction, and driving the result and the result valid signal to the reorder buffer, the result being defined for one or more subfields and the result valid signal designating a valid result for the corresponding one or more sub-fields.

8. A processor which executes operations operating on variable-sized operands, comprising:

an instruction decoder including:
an operand field selector which defines a variable-sized operand by designating defined and undefined operand fields within a full-sized operand, the defined field being defined for usage of an instruction, and
a dispatcher coupled to the operand field selector and dispatching operation codes, operand identifiers and utilized operand field identifiers;

18 a reorder buffer coupled to the instruction decoder and including:
a speculative result memory coupled to the dispatcher and storing the operand identifiers and utilized field identifiers, and storing speculative results generated during execution of an instruction; and
a data dependency comparator coupled to the speculative result memory, the data dependency comparator detecting data dependencies of a utilized operand field and tagging data dependent fields independently of other fields; and a functional unit coupled to the reorder buffer, the functional unit executing instructions operative upon the result data as directed according to the operand identifiers and utilized field identifiers and generating result data.

9. A functional unit for executing instructions in a processor, the functional unit comprising:

a multiplexer connected to an operand bus and an operand tag bus, the operand bus supplying operands operated upon by the instruction and the operand tag bus supplying tags of data dependent fields, the tags tagging data dependent fields independently of other fields;

a buffer coupled to the multiplexer, the buffer including an operand storage storing operands defined for one or more sub-fields and a tag storage storing data dependency tags for the corresponding one or more sub-fields;

an execution unit coupled to the buffer, the execution unit executing instructions operative upon the operands stored in the operand storage.

10. A functional unit according to claim 9, further comprising:

a forwarding circuit coupled to the execution unit and coupled to the buffer, the forwarding circuit receiving results from the execution unit and receiving data dependency tags from the tag storage, the forwarding circuit forwarding results to the operand storage as directed by the data dependency tags, the results being forwarded for one or more sub-fields independently of other sub-fields.

11. A functional unit according to claim 9, wherein:
a buffer is a first-in-first-out (FIFO) buffer.

12. A processor according to claim 9, wherein the functional unit further comprises:

a forwarding circuit coupled to the execution unit and coupled to the buffer, the forwarding circuit receiving results from the execution unit and receiving data dependency tags from the tag storage, the forwarding circuit forwarding results to the operand storage as directed by the data dependency tags, the results being forwarded for one or more sub-fields independently of other sub-fields.

13. A processor according to claim 9, wherein:
the buffer is a first-in-first-out (FIFO) buffer.

14. A processor comprising:
a decoder;
a reorder buffer storing operands and operand tags;
an operand bus coupled to the reorder buffer;
an operand tag bus coupled to the reorder buffer; and
a functional unit including:
a multiplexer connected to an operand bus and an operand tag bus, the operand bus supplying operands operated upon by the instruction and the operand tag bus supplying tags of data dependent fields, the tags tagging data dependent fields independently of other fields;

a buffer coupled to the multiplexer, the buffer including an operand storage storing operands defined for one or more sub-fields and a tag storage storing data dependency tags for the corresponding one or more sub-fields; and an execution unit coupled to the buffer, the execution unit executing instructions operative upon the operands stored in the operand storage.

15. A load/store functional unit for executing generic load and generic store instructions in a processor including a cache, the load/store functional unit comprising:

a multiplexer connected to an operand bus and an operand tag bus, the operand bus supplying operands operated upon by the instruction and the operand tag bus supplying tags of data dependent fields, the tags tagging data dependent fields independently of other sub-fields;

a buffer coupled to the multiplexer, the buffer including an operand storage storing operands defined for one or more sub-fields and a tag storage storing data dependency tags for the corresponding one or more sub-fields;

a merge circuit coupled to the buffer and coupled to the cache; and a store buffer coupled to the merger circuit, the store buffer including a plurality of storage elements storing a mixture of data operands and operand tags, the merge circuit merging data of one or more sub-fields independent of other sub-fields into the store buffer, the store buffer holding all data sub-fields in a partially complete storage element until all storage elements are available before writing the storage element to the cache.

16. A processor according to claim 15 wherein:

the buffer is a first-in-first-out (FIFO) buffer.

17. A processor according to claim 15, wherein:

the cache is a data cache.

18. A processor comprising:

a decoder;

a reorder buffer storing operands and operand tags;

an operand bus coupled to the reorder buffer;

an operand tag bus coupled to the reorder buffer; and a load/store functional unit including:

a multiplexer connected to an operand bus and an operand tag bus, the operand bus supplying operands operated upon by the instruction and the operand tag bus supplying tags of data dependent fields, the tags tagging data dependent fields independently of other sub-fields;

a buffer coupled to the multiplexer, the buffer including an operand storage storing operands defined for one or more sub-fields and a tag storage storing data dependency tags for the corresponding one or more sub-fields;

a merge circuit coupled to the buffer and coupled to the cache; and a store buffer coupled to the merger circuit, the store buffer including a plurality of storage elements storing a mixture of data operands and operand tags, the merge circuit merging data of one or more sub-fields independent of other sub-fields into the store buffer, the store buffer holding all data sub-fields in a partially complete storage element until all storage elements are available before writing the storage element to the cache.

19. A processor according to claim 18 wherein:

the buffer is a first-in-first-out (FI2FO) buffer.

20. A processor according to claim 18, wherein:

the cache is a data cache.

21. In a processor, a method for executing operations utilizing variable-sized operands comprising:

defining a division of full-sized operands bit-wise into a plurality of sub-fields;

for an operation, determining for the sub-fields independent of the other sub-fields whether data of a sub-field that is utilized by the operation is dependent on an unavailable result of an unfinished operation; and executing the operation utilizing data of the sub-field if data in all utilized sub-fields are not dependent on an unavailable result, and otherwise waiting for dependent data in the sub-fields to become available and then executing the operation.

22. A method as in claim 21, wherein the dependence determining step further comprises the steps of:

defining for an operation a destination operand and associated sub-fields and a source operand and associated sub-fields;

storing identifiers of the destination operand and associated sub-fields for a plurality of operations;

comparing the source operand and sub-field identifiers to the stored destination operands and sub-fields; and determining a data dependency when source operand and sub-field identifiers match stored destination operand and sub-field identifiers.

23. A processor including a circuit for performing the method according to claim 22.

24. A superscalar processor for executing instructions out-of-order and including a circuit for performing the method according to claim 22.

25. A processor including a circuit for performing the method according to claim 21.

26. A superscalar processor for executing instructions out-of-order and including a circuit for performing the method according to claim 21.

* * * * *

UNITED STATES PATENT AND TRADEMARK OFFICE
CERTIFICATE OF CORRECTION

PATENT NO. : 5,737,629
DATED : April 7, 1998
INVENTOR(S) : Gerald D. Zuraski, Jr., Scott A. White, Murali S. Chinnakonda, David S. Christie It is certified that error appears in the above-identified patent and that said Letters Patent is hereby corrected as shown below:

On the Title page, page 2, Item [56] References Cited, Other Publication, page 2:

Line 2, delete "Pr" and insert --Pre--.
Line 7, delete "Hig" and insert --High--.
Line 8, delete "Johnso" and insert --Johnson--.
Line 11, delete "Hig" and insert --High--.
Line 13, delete "M-2218" and insert --M-2518--.

Col. 20, line 13, delete "(F12F0)" and insert --(FIFO)--.

Signed and Sealed this

Twenty-third Day of February, 1999

Attest:

Q. TODD DICKINSON

*Attesting Officer*   *Acting Commissioner of Patents and Trademarks*